(12) United States Patent
Sütterlin et al.

(10) Patent No.: US 10,899,527 B2
(45) Date of Patent: Jan. 26, 2021

(54) METHOD AND CONTAINER FOR STORAGE AND TRANSPORT OF POLYAMIDE GRANULATES AND CORRESPONDINGLY STORED OR TRANSPORTED POLYAMIDE GRANULATE AND ALSO MOULDED ARTICLES PRODUCED THEREFROM

(71) Applicant: EMS-PATENT AG, Domat/Ems (CH)

(72) Inventors: Martin Sütterlin, Munich (DE); Thomas Wiedemann, Domat/Ems (CH); Manfred Hewel, Domat/Ems (CH); Sepp Bass, Domat/Ems (CH)

(73) Assignee: EMS-Patent AG, Domat/Ems (CH)

( * ) Notice: Subject to any disclaimer, the term of this patent is extended or adjusted under 35 U.S.C. 154(b) by 379 days.

(21) Appl. No.: 15/385,432

(22) Filed: Dec. 20, 2016

(65) Prior Publication Data
US 2017/0183140 A1 Jun. 29, 2017

(30) Foreign Application Priority Data

Dec. 23, 2015 (EP) .................................... 15202255

(51) Int. Cl.
*B65D 81/26* (2006.01)
*C08G 69/36* (2006.01)
(Continued)

(52) U.S. Cl.
CPC ............ *B65D 81/268* (2013.01); *B29B 13/00* (2013.01); *C08G 69/26* (2013.01); *C08G 69/265* (2013.01);
(Continued)

(58) Field of Classification Search
CPC .. B65D 81/268; B65D 81/266; B65D 81/267; B29B 13/00; C08G 69/26; C08G 69/265; C08G 69/36
(Continued)

(56) References Cited

U.S. PATENT DOCUMENTS 3,936,426 A * 2/1976 Campbell .............. C08G 69/26
528/344
5,977,212 A 11/1999 Ebner et al.
(Continued)

FOREIGN PATENT DOCUMENTS

EP 0 864 630 A1 9/1998
EP 1 186 552 A1 3/2002
(Continued)

OTHER PUBLICATIONS

European Patent Office, Notification under Article 94 (3) EPC in European Application No. 15 202 255.4 (dated Mar. 15, 2019).
(Continued)

*Primary Examiner* — Rafael A Ortiz
(74) *Attorney, Agent, or Firm* — Leydig, Voit & Mayer, Ltd.

(57) ABSTRACT

The invention relates to a method for storage and for transport of polyamide granulate which comprises at least one amorphous or microcrystalline polyamide. By means of this novel method, yellowing during further processing to form the moulded article can be avoided or at least reduced. Likewise, the invention relates to a corresponding container in which the polyamide granulate is stored. The invention also relates to correspondingly stored or transported polyamide granulate and also moulded articles produced therefrom.

8 Claims, 1 Drawing Sheet

(51) Int. Cl.
*C08G 69/26* (2006.01)
*B29B 13/00* (2006.01)

(52) U.S. Cl.
CPC ............ *C08G 69/36* (2013.01); *B65D 81/266* (2013.01); *B65D 81/267* (2013.01)

(58) Field of Classification Search
USPC .............................................. 206/204, 524.4
See application file for complete search history.

(56) References Cited

U.S. PATENT DOCUMENTS

| | | | |
|---|---|---|---|
| 6,482,889 | B1 | 11/2002 | Kurz |
| 7,723,411 | B2 | 5/2010 | Schneider |
| 7,973,191 | B2 | 7/2011 | Döring et al. |
| 8,022,170 | B2 | 9/2011 | Hoffman et al. |
| 8,268,956 | B2 | 9/2012 | Büler et al. |
| 8,383,244 | B2 | 2/2013 | Bayer et al. |
| 8,404,323 | B2 | 3/2013 | Pfleghar et al. |
| 8,586,662 | B2 | 11/2013 | Harder et al. |
| 8,604,120 | B2 | 12/2013 | Stoppelmann et al. |
| 8,993,662 | B2 | 3/2015 | Harder |
| 9,109,115 | B2 | 8/2015 | Bühler |
| 9,133,322 | B2 | 9/2015 | Roth et al. |
| 9,359,532 | B2 | 6/2016 | Kaplan |
| 9,453,106 | B2 | 9/2016 | Büler |
| 9,644,081 | B2 | 5/2017 | Aepli et al. |
| 9,663,655 | B2 | 5/2017 | Aepli et al. |
| 9,815,967 | B2 | 11/2017 | Harder et al. |
| 9,963,547 | B2 | 5/2018 | Hoppe et al. |
| 9,963,591 | B2 | 5/2018 | Bayer et al. |
| 9,969,882 | B2 | 5/2018 | Thomas et al. |
| 10,144,805 | B2 | 12/2018 | Bayer et al. |
| 2004/0259996 | A1 | 12/2004 | Stoppelmann et al. |
| 2006/0122360 | A1 | 6/2006 | Tsujii et al. |
| 2006/0235190 | A1 | 10/2006 | Hoffman et al. |
| 2006/0264542 | A1 | 11/2006 | Schneider |
| 2008/0135720 | A1 | 6/2008 | Büler et al. |
| 2008/0300347 | A1 | 12/2008 | Kurz et al. |
| 2009/0171038 | A1 | 7/2009 | Steffner |
| 2010/0069657 | A1 | 3/2010 | Döring et al. |
| 2010/0168423 | A1 | 7/2010 | Döring et al. |
| 2010/0279111 | A1 | 11/2010 | Harder et al. |
| 2011/0217495 | A1* | 9/2011 | Stoeppelmann ........ B32B 27/00 428/35.7 |
| 2011/0220667 | A1 | 9/2011 | Pfleghar et al. |
| 2012/0029133 | A1 | 2/2012 | Stöppelmann et al. |
| 2012/0115993 | A1 | 5/2012 | Kaplan |
| 2012/0237708 | A1 | 9/2012 | Caviezel et al. |
| 2012/0321829 | A1 | 12/2012 | Bayer et al. |
| 2013/0317168 | A1 | 11/2013 | Bühler |
| 2014/0094548 | A1 | 4/2014 | Roth et al. |
| 2014/0135458 | A1 | 5/2014 | Kaplan |
| 2014/0171573 | A1 | 6/2014 | Bayer et al. |
| 2014/0272227 | A1 | 9/2014 | Jeltsch et al. |
| 2014/0275392 | A1 | 9/2014 | Buhler |
| 2015/0051343 | A1 | 2/2015 | Kaplan |
| 2015/0104638 | A1 | 4/2015 | Jeltsch et al. |
| 2015/0126635 | A1 | 5/2015 | Liedloff et al. |
| 2015/0126701 | A1 | 5/2015 | Liedloff et al. |
| 2015/0218374 | A1 | 8/2015 | Thomas et al. |
| 2015/0232251 | A1* | 8/2015 | Ikeda .................. B65D 81/268 206/0.7 |
| 2015/0284531 | A1 | 10/2015 | Aepli et al. |
| 2015/0291795 | A1 | 10/2015 | Aepli |
| 2015/0352765 | A1 | 12/2015 | Hoffmann et al. |
| 2015/0368398 | A1 | 12/2015 | Hoppe et al. |
| 2016/0130439 | A1 | 5/2016 | Koch et al. |
| 2016/0280914 | A1 | 9/2016 | Thomas et al. |
| 2016/0297123 | A1 | 10/2016 | Weis et al. |
| 2016/0369098 | A1 | 12/2016 | Yasuda et al. |
| 2016/0376423 | A1 | 12/2016 | Harder et al. |
| 2017/0058123 | A1 | 3/2017 | Sütterlin et al. |
| 2017/0107326 | A1 | 4/2017 | Bayer et al. |
| 2017/0137608 | A1 | 5/2017 | Stöppelmann |
| 2017/0137609 | A1 | 5/2017 | Stöppelmann |
| 2017/0183140 | A1 | 6/2017 | Sütterlin et al. |
| 2017/0225414 | A1 | 8/2017 | Cheung |
| 2018/0022900 | A1 | 1/2018 | Nakano et al. |
| 2018/0100064 | A1 | 4/2018 | Aepli et al. |
| 2018/0112059 | A1 | 4/2018 | Fujii et al. |
| 2018/0155545 | A1 | 6/2018 | Stöppelmann et al. |
| 2018/0171141 | A1 | 6/2018 | Thomas et al. |
| 2018/0251599 | A1 | 9/2018 | Hoffmann et al. |
| 2018/0251600 | A1 | 9/2018 | Aepli et al. |
| 2018/0298191 | A1 | 10/2018 | Schubert et al. |
| 2019/0055356 | A1 | 2/2019 | Aepli et al. |
| 2019/0055404 | A1 | 2/2019 | Aepli et al. |
| 2019/0055405 | A1 | 2/2019 | Aepli et al. |
| 2019/0062554 | A1 | 2/2019 | Wiedemann et al. |

FOREIGN PATENT DOCUMENTS

| | | |
|---|---|---|
| EP | 1 347 007 A1 | 9/2003 |
| JP | H03-293118 A | 12/1991 |
| JP | 2003-335378 A1 | 11/2003 |
| JP | 2004-083911 A1 | 3/2004 |
| JP | 52-88079 B1 | 9/2013 |

OTHER PUBLICATIONS

Taiwan Intellectual Property Office, Notice of Examination in Taiwanese Patent Application No. 105139364 (dated Jul. 11, 2019).
Brazilian National Institute of Industrial Property, Search Report and Written Opinion issued in Brazilian Patent Application No. BR112016030013-4 (dated Jan. 27, 2020).
Japan Patent Office, Notification of Reasons for Rejection in Japanese Patent Application No. 2016-243214 (dated Mar. 11, 2020).
European Patent Office, Extended European Search Report issued in European Application No. 15202255.4 (dated Jun. 24, 2016) 13 pp.
European Patent Office, Communication under Article 94(3) EPC in European Application No. 15 202 255.4 (dated Aug. 27, 2020).
Japan Patent Office, Notification of Reasons for Rejection in Japanese Patent Application No. 2016-243214 (dated Sep. 30, 2020).

* cited by examiner

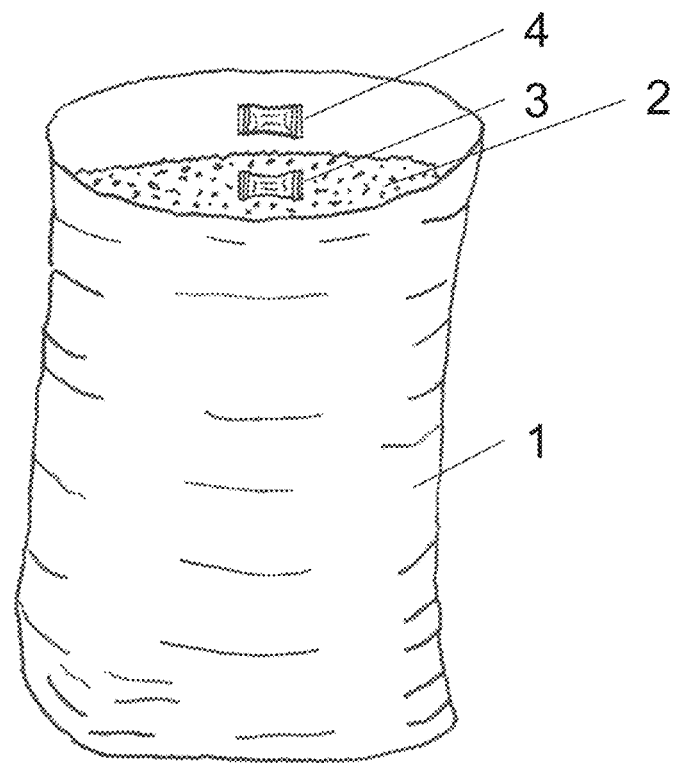

METHOD AND CONTAINER FOR STORAGE AND TRANSPORT OF POLYAMIDE GRANULATES AND CORRESPONDINGLY STORED OR TRANSPORTED POLYAMIDE GRANULATE AND ALSO MOULDED ARTICLES PRODUCED THEREFROM

CROSS-REFERENCE TO A RELATED APPLICATION

This patent application claims the benefit of European Patent Application No. 15 202 255.4, filed on Dec. 23, 2015, the disclosure of which is incorporated herein by reference in its entirety for all purposes.

BACKGROUND OF THE INVENTION

The invention relates to a method for storage and for transport of polyamide granulate which comprises at least one amorphous or microcrystalline polyamide. By means of this novel method, yellowing during further processing to form the moulded article can be avoided or at least reduced. Likewise, the invention relates to a corresponding container in which the polyamide granulate is stored. The invention also relates to correspondingly stored or transported polyamide granulate and also moulded articles produced therefrom.

Storage and transport of polyamide granulate before further processing is generally effected in containers of the most varied types, such as e.g. sacks, bags, big bags, boxes, octabins, barrels, buckets, canisters or cans.

As is known, it is critical during storage or transport of polyamide granulate that frequently yellowing during further processing of such granulates can be observed although the granulates themselves display no yellowing after storage. In fact, a large number of heat stabilisers for use in polyamides exists, however these display no effect during storage or transport of polyamide granulate.

In the state of the art, solutions which are based on preventing or at least minimising contact between sensitive products and ambient air have been known for a while.

It is known from the foodstuff sphere to use oxygen absorbers in order to prevent spoiling of the foodstuff. Such an approach is known for example from EP 0864 630 A1 in which packaging is described for the preservation of foodstuff which comprises small bags with oxygen-absorbing compounds.

SUMMARY OF THE INVENTION

Starting herefrom, it was the object of the present invention to enable improved storage- or transport conditions for polyamides so that, without the addition of additives to the polyamide, further processing which is as free of yellowing as possible can be achieved.

This object is achieved by the features of the container having the features described herein, by the method described herein, by the polyamide granulate according to the invention, and by the moulded article produced therefrom. Advantageous developments are also described.

BRIEF DESCRIPTION OF THE DRAWING

The FIGURE illustrates a container containing polyamide granulate, and an oxygen absorber in a volume different than the volume where the polyamide granulate is kept.

DETAILED DESCRIPTION OF THE INVENTION

According to the invention a method for storage and for transport of polyamide granulate is provided, comprising at least one amorphous or microcrystalline polyamide, whilst avoiding or reducing yellowing of moulded articles produced from the granulate, in which method the polyamide granulate is kept in a container with a barrier effect relative to oxygen and moisture, in which container at least one oxygen absorber is contained and produces an essentially oxygen-free atmosphere in the container which essentially prevents contact of the granulate with oxygen from the ambient air. As a result of the barrier effect of the container, penetration of additional oxygen and moisture from the ambient air into the container is essentially prevented. This means that the container is gas- and moisture-impermeable.

Surprisingly, it was able to be established that, by the addition of an oxygen absorber and the essentially oxygen-free atmosphere producible therewith, storage and transport of polyamide granulates is made possible and leads also to no notable yellowing even during further processing of the granulate.

All the compounds according to the invention which enable absorption of oxygen from ambient air are possible as oxygen absorber.

In a preferred embodiment, it is provided that the oxygen absorber is at least one oxidisable metal compound from the group of metal powders, metal oxides, metal salts or mixtures hereof.

As oxidisable metal powders, in particular powders of iron, tin, copper, cobalt, chromium, manganese, vanadium, titanium or mixtures hereof are preferred. As oxidisable metal oxides or metal salts, in particular oxides or salts of iron, copper, cobalt, chromium or mixtures hereof are preferred.

It is thereby preferred that the quantity of oxidisable metal compounds in the container is preferably in the range of 20 to 400 mmol, preferably 30 to 300 mmol, particularly preferably 40 to 200 mmol, per litre of residual volume. There is intended here by residual volume, the volume of the container not occupied by the polyamide granulate.

In order to increase the effect thereof as oxygen absorber, the oxidisable metal powders, oxidisable metal oxides or oxidisable metal salts can be preferably combined with oxidation catalysts. The oxidation catalysts for oxidisable metal powders, oxidisable metal oxides or oxidisable metal salts are halogenides of alkali metals, alkaline earth metals or mixtures thereof.

The halogenides are selected preferably from the group consisting of chlorine, bromine and iodine. Particularly preferably, the halogenides are selected from the group consisting of chlorine and iodine. Preferably, the alkali- or alkaline earth metals are selected from the group consisting of sodium, potassium, calcium, magnesium and barium. Particularly preferably, the alkali- or alkaline earth metals are selected from the group consisting of sodium, potassium and calcium.

The oxidation catalysts for oxidisable metal powders, oxidisable metal oxides or oxidisable metal salts are preferably added in quantities of 0.05 to 35% by weight, preferably 0.1 to 17% by weight, particularly preferably 0.5 to 10% by weight, relative to the oxidisable metal powder, the oxidisable metal oxide or the oxidisable metal salt.

To the systems comprising oxidisable metal powders and oxidation catalysts, oxidisable metal oxides and oxidation catalyst or oxidisable metal salts and oxidation catalyst, a moistening substance can possibly be added. The moistening substance is preferably selected from the group consisting of activated carbon, silicates, zeolites, molecular sieves, hydrogels, perlites and diatomite.

A further preferred embodiment provides that the oxygen absorber is an oxidisable organic or inorganic compound or an enzyme. As oxidisable organic compound, ascorbic acid, isoascorbic acid, catechol, hydroquinone, unsaturated carboxylic acids, derivatives of unsaturated carboxylic acids (e.g. esters) or mixtures hereof are preferred. As oxidisable inorganic compounds, sulphites (e.g. $CaSO_3$), dithionites (e.g. sodium dithionite, zinc dithionite) or mixtures hereof are preferred.

The oxidisable metal compounds, oxidisable organic or inorganic compounds, which are used as oxygen absorber, are preferably filled into sachets, the sachets consisting preferably of oxygen-permeable materials, in particular made of paper, polyolefins, material, filter paper, textile membranes, materials provided with holes or micropores or combinations thereof.

A further preferred embodiment provides that the oxygen absorber is an oxidisable polymer.

The oxidisable polymer is preferably selected from the group consisting of
olefinic polymers with aliphatic carbon-carbon double bonds in the main chain or in the side chain, comprising linear or cyclic polyenes with conjugated or unconjugated double bonds,
olefinic polymers with tertiary carbon atoms in the main chain,
polymers comprising activated methylene groups in the main chain and
polymers comprising aldehyde groups.

Preferred olefinic polymers with aliphatic carbon-carbon double bonds in the main chain or in the side chain, comprising linear or cyclic polyenes with conjugated or unconjugated double bonds are polybutadiene, polyisoprene, ethylene-propylene-diene copolymers, polyterpenes, dicyclopentadiene-comprising polymers or polymers comprising repeatedly unsaturated norbornene derivatives, such as e.g.: vinyl norbornene, ethylidene norbornene, isopropylidene norbornene or diisopropylidene norbornene.

Preferred olefinic polymers with tertiary carbon atoms in the main chain are polymers formed from α-olefins with 3 to 20, preferably 3 to 10, carbon atoms or polymers or copolymers with benzene rings in the side chains. Particularly preferred olefinic polymers or copolymers with tertiary carbon atoms in the main chain are polypropylene, poly-1-butene, poly-1-hexene, poly-1-octene, ethylene-propylene copolymer, ethylene-butene-1 copolymer, ethylene-propylene-butene-1 copolymer, polystyrene, styrene-butadiene copolymer or styrene-isoprene copolymer.

Preferred polymers comprising activated methylene groups in the main chain are polyamides or olefin-carbon monoxide copolymers. Amongst the polyamides, polyamides comprising m-xylylene diamine, p-xylylene diamine or mixtures thereof are preferred. Particularly preferred polyamides are PA MXD6, PA MXD10, PA MXD9, PA MXD7, PA MXD6/MXDI or mixtures or copolymers thereof, the MXD being able to be replaced entirely or partially by PXD and also lactams or ω-amino acids with 4 to 12 carbon atoms as comonomers being able to be contained. The possible proportion of lactams or ω-amino acids is at most 30% by mol, relative to 100% by mol the total polyamide. Very particularly preferably, the polyamides are free of lactams or ω-amino acids. The proportion of isopthalic acid in the polyamide PA MXD6/MXDI is preferably 2 to 15% by mol, particularly preferably 2 to 12% by mol, very particularly preferably 2 to 8% by mol, the sum of the two dicarboxylic acids producing 100% by mol.

Preferred polymers, comprising aldehyde groups, are polymers comprising acrolein, methacrolein or mixtures thereof as monomer or are copolymers of these monomers or monomer mixtures with styrene.

In order to be able to develop the effect thereof as oxygen absorber, the oxidisable polymers must be combined with oxidation catalysts. The oxidation catalysts for oxidisable polymers are added in quantities of 0.001 to 3% by weight, preferably 0.005 to 1% by weight, particularly preferably 0.01 to 0.5% by weight, very particularly preferably 0.03 to 0.15% by weight, relative to the oxidisable polymer.

The oxidation catalysts for oxidisable polymers are compounds of the transition metals. The compounds of the transition metals are preferably selected from the group consisting of halogenides, sulphates, nitrates, phosphates, silicates, complex salts, sulphonic acid salts, phosphonic acid salts and carboxylic acid salts. The carboxylic acids used for the carboxylic acid salts are linear or branched. Preferably, the carboxylic acids have 2 to 22 carbon atoms. Particularly preferred carboxylic acids are neodecanoic acid or stearic acid.

The transition metals are selected from the group consisting of iron, cobalt, nickel, copper, silver, zinc, tin, titanium, zirconium, vanadium, chromium and manganese. Preferably, the transition metals are selected from the group consisting of iron, cobalt, nickel, copper, zinc, chromium and manganese. Particularly preferably, the transition metals are selected from the group consisting of cobalt, copper, zinc and manganese. Very particularly preferably, the transition metal is cobalt.

Particularly preferred oxidation catalysts for oxidisable polymers are the carboxylic acid salts of the transition metals. Very particularly preferred oxidation catalysts for oxidisable polymers are the carboxylic acid salts of cobalt.

A particularly preferred embodiment provides that the oxygen absorber is selected from the group consisting of oxidisable metal powders and oxidisable polymers.

According to the invention, a container with a barrier effect relative to oxygen and moisture is used, as a result of which penetration of additional oxygen and moisture from the ambient air into the container is essentially prevented. The container can thereby comprise at least one barrier layer which is selected in particular from the group consisting of metal, aluminium, ethylene-vinyl alcohol copolymers (EVOH), polyvinylidene chloride (PVDC), polyvinyl chloride (PVC), polyolefins, polyethylene and combinations thereof.

The polyamides to be stored or transported are specified more precisely subsequently.

The spellings and abbreviations for polyamides and the monomers thereof are established in the ISO standard 16396-1:2015. There are therefore used inter alia the following abbreviations for aromatic or non-linear aliphatic monomers:
in the case of the diamines, MXD stands for m-xylylene diamine, PXD for p-xylylene diamine, MACM for 3,3'-dimethyl-4,4'-diaminodicyclohexylmethane, PACM for bis (p-aminocyclohexyl)methane, TMDC for 3,5,3',5'-tetramethyl-4,4'-diaminodicyclohexylmethane, ND for 1,6-diamino-2,2,4-trimethylhexane and IND for 1,6-diamino-2,4,4-trimethylhexane.

In the case of the dicarboxylic acids, T stands for terephthalic acid, I for isophthalic acid and N for naphthalene dicarboxylic acid.

If the polyamides comprise only dicarboxylic acids and diamines, then the molar quantities thereof add up to 50% by mol for the sum of all the diamines and 50% by mol for the sum of all the dicarboxylic acids and the sum of the diamine- and dicarboxylic acid quantities produces 100% by mol for the polyamide.

If the polyamides comprise, in addition to dicarboxylic acids and diamines, also lactams or ω-amino acids to X % by mol, then the sum of all the diamines is still only (50-0.5 X) % by mol and the sum of all the dicarboxylic acids (50-0.5 X) % by mol, relative to 100% by mol of polyamide.

The quantity data with respect to the monomers should thereby be understood such that a corresponding molar ratio of these monomers used in the polycondensation is also found again in the polyamides produced in this way by polycondensation.

In the case of the quantity data for the dicarboxylic acids and diamines of the polyamides, it applies that the sum of the molar quantities of all the diamines is essentially equal to the sum of the molar quantities of all the dicarboxylic acids. Essentially, equal to thereby means a maximum excess of dicarboxylic acids or of diamines of 5%, i.e. the molar ratio of dicarboxylic acids to diamines is 1.05:1 to 1:1.05. Preferably, a maximum excess of dicarboxylic acids or of diamines is 2%, i.e. the molar ratio of dicarboxylic acids to diamines is 1.02:1 to 1:1.02.

The polyamide granulate is produced with at least one amorphous or microcrystalline polyamide or mixtures of at least one amorphous or microcrystalline polyamide with at least one partially crystalline polyamide and/or with at least one impact modifier.

The mixtures can be present as physical mixtures or as extruded or compounded mixtures.

The amorphous or microcrystalline polyamides show, in dynamic differential scanning calorimetry (DSC) according to ISO 11357, at a heating rate of 20 K/min, a heat of fusion preferably of at most 30 J/g, preferably of at most 25 J/g, particularly preferably 0 to 22 J/g.

The amorphous polyamides, compared with the microcrystalline polyamides, have an even lower heat of fusion. The amorphous polyamides show, in dynamic differential scanning calorimetry (DSC) according to ISO 11357, at a heating rate of 20 K/min, preferably a heat of fusion of at most 5 J/g, preferably of at most 3 J/g, particularly preferably of 0 to 1 J/g.

Amorphous polyamides have no melting point because of their amorphicity.

Microcrystalline polyamides are partially crystalline polyamides and therefore have a melting point. Their melting point is preferably at most 260° C., measured according to ISO 11537. They have a morphology, in which the crystallites have such a small dimension that a plate produced therefrom with a thickness of 2 mm is still transparent, i.e. the light transmission thereof is at least 75%, measured according to ASTM D 1003.

With respect to the at least one amorphous or microcrystalline polyamide, there is no restriction. Preferably, the amorphous or microcrystalline polyamide is selected from the group consisting of amorphous or microcrystalline polyamides with a glass transition temperature (measured according to ISO 11357) of 40 to 225° C., preferably of 60 to 215° C., particularly preferably of 105 to 210° C., very particularly preferably of 130 to 205° C.

The amorphous or microcrystalline polyamide is preferably formed from at least one diamine and at least one dicarboxylic acid and possibly from at least one lactam and/or at least one ω-amino acid.

Preferably the at least one diamine is selected from a group consisting of ethylene diamine, butane diamine, pentane diamine, methylpentane diamine, hexamethylene diamine, octane diamine, methyloctane diamine, nonane diamine, decane diamine, undecane diamine, dodecane diamine, diaminotrimethylhexane, bis(aminocyclohexyl)methane and the alkyl derivatives thereof, bis(aminocyclohexyl)propane and the alkyl derivatives thereof, isophorone diamine, norbornane diamine, bis(aminomethyl)norbornane, xylylene diamine, cyclohexane diamine and bis(aminomethyl)cyclohexane and the alkyl derivatives thereof.

Preferably, the at least one dicarboxylic acid is selected from a group consisting of succinic acid, glutaric acid, adipic acid, pimelic acid, suberic acid, azelaic acid, sebacic acid, undecanedioic acid, dodecanedioic acid, brassylic acid, tetradecanedioic acid, pentadecanedioic acid, hexadecanedioic acid, heptadecanedioic acid, octadecanedioic acid, nonadecanedioic acid, eicosandioic acid, japanic acid, cyclohexane dicarboxylic acid, phenylindane dicarboxylic acid, phenylenedioxydiacetic acid, dimerised fatty acid with 36 or 44 C-atoms, isophthalic acid, terephthalic acid and naphthalene dicarboxylic acid.

Preferably the at least one lactam or the at least one ω-amino acid is selected from the group consisting of lactams with 4 to 15 C-atoms and of co-amino acids with 4 to 15 C-atoms.

Particularly preferably, the at least one diamine is selected from the group consisting of hexamethylene diamine, 1,6-diamino-2,2,4-trimethylhexane, 1,6-diamino-2,4,4-trimethylhexane, 2-methyl-1,5-pentane diamine, 3,3'-dimethyl-4,4'-diaminodicyclohexylmethane, bis(p-aminocyclohexyl)methane, 3,3'-diethyl-4,4'-diaminodicyclohexylmethane, 3,5,3',5'-tetramethyl-4,4'-diaminodicyclohexylmethane, 2,2-bis(p-aminodicyclohexyl)propane, isophorone diamine, norbornane diamine, m-xylylene diamine, p-xylylene diamine and 1,3-bis(aminomethyl)cyclohexane.

Particularly preferably, the at least one dicarboxylic acid is selected from the group consisting of 1,6-hexanedioic diacid, 1,9-nonanedioic acid, 1,10-decanedioic acid, 1,12-dodecanedioic acid, 1,13-tridecanedioic acid, 1,14-tetradecanedioic acid, 1,15-pentadecanedioic acid, 1,16-hexadecanedioic acid, 1,18-octadecanedioic acid, 1,3-cyclohexanedicarboxylic acid, 1,4-cyclohexanedicarboxylic acid, phenylindane dicarboxylic acid, 1,4-phenylene dioxydiacetic acid, 1,3-phenylene dioxydiacetic acid, dimer fatty acid with 36 or 44 C-atoms, isophthalic acid, terephthalic acid and 2,6-naphthalene dicarboxylic acid.

Particularly preferred lactams are lactams or ω-amino acids with 4, 6, 7, 8, 11 or 12 C-atoms. These are selected from the group consisting of pyrrolidin-2-one (4 C-atoms), ε-caprolactam (6 C-atoms), oenanthlactam (7 C-atoms), capryllactam (8 C-atoms), laurinlactam (12 C-atoms), 4-aminobutanoic acid, 6-aminohexanoic acid, 7-aminoheptanoic acid, 8-aminooctanoic acid, 11-aminoundecanoic acid and 12-aminododecanoic acid.

Very particularly preferably, the lactams or ω-amino acids are selected from the group consisting of ε-caprolactam (6 C-atoms), laurinlactam (12 C-atoms), 6-aminohexanoic acid and 12-aminododecanoic acid.

Preferably, the amorphous or microcrystalline polyamide is formed from at least one diamine and at least one dicarboxylic acid and possibly from at least one lactam and/or at least one ω-amino acid and comprises at least one cycloaliphatic diamine or at least one aliphatic diamine with an aromatic structural component or at least one aromatic dicarboxylic acid.

Preferably, the at least one cycloaliphatic diamine or the at least one aliphatic diamine with an aromatic structural component is selected from the group consisting of bis (aminocyclohexyl)methane and the alkyl derivatives thereof, bis(aminocyclohexyl)propane and the alkyl derivatives thereof, isophorone diamine, norbornane diamine, bis (aminomethyl)norbornane, xylylene diamine, cyclohexane diamine, bis(aminomethyl)cyclohexane and the alkyl derivatives thereof.

In particular, it is preferred if the amorphous or microcrystalline polyamides are selected from the group consisting of PA 6I, PA 6I/6T, PA 6I/6T/6N, PA MXDI/6I, PA MXDI/MXDT/6I/6T, PA MXDI/12I, PA MXDI, PA MXDI/MXD6, PA MACM10, PA MACM12, PA MACM14, PA MACM18, PA NDT/INDT, PA TMDC10, PA TMDC12, PA TMDC14, PA TMDC18, PA PACM12, PA PACM14, PA PACM18, PA PACM10/11, PA PACM10/12, PA PACM12/612, PA PACM12/PACM14/612/614, PA MACMI/12, PA MACMT/12, PA MACMI/MACM12, PA MACMI/MACMN, PA MACMT/MACM12, PA MACMT/MACMN, PA MACM36, PA TMDC36, PA MACMI/MACM36, PA 6I/MACMI/12, PA MACMT/MACM36, PA MACMI/MACMT/12, PA 6I/6T/MACMI/MACMT, PA 6I/6T/MACMI/MACMT/12, PA MACM6/11, PA MACM6/12, PA MACM10/11, PA MACM10/12, PA MACM10/1010, PA MACM12/1012, PA MACM12/1212, PA MACM14/1014, PA MACM14/1214, PA MACM18/1018, PA 6I/6T/MACMI/MACMT/MACM12/612, PA 6I/6T/MACMI/MACMT/MACM12, PA MACMI/MACMT/MACM12/12, PA MACMI/MACMT/MACM12, PA 6I/6T/MACMI/MACMT/12, PA 6I/6T/6N/MACMI/MACMT/MACMN, PA TMDC12/TMDCT/TMDC36, PA TMDC12/TMDCI, PA TMDC12/TMDCI/TMDC36 and PA TMDC12/TMDCT and mixtures or copolymers hereof, the MACM being able to be replaced up to at most 35% by mol by PACM and/or TMDC, relative to the sum of the molar proportions of all the monomers of 100% by mol and/or the laurinlactam being able to be replaced entirely or partially by caprolactam.

With respect to the naphthalene dicarboxylic acid content, a quantity of at most 10% by mol, relative to the sum of the molar proportions of all the monomers of 100% by mol, is preferred.

The lactam- and/or ω-amino acid content of the amorphous or microcrystalline polyamide is 0 to 40% by mol, preferably 0 to 35% by mol, relative to the sum der molar proportions of all the monomers of 100% by mol.

The amorphous or microcrystalline polyamide is selected, particularly preferably, from the group consisting of PA 6I/6T, PA MXDI/6I, PA MXDI/MXD6, PA MACM10, PA MACM12, PA MACM14, PA MACM18, PA MACM36, PA TMDC10, PA TMDC12, PA TMDC14, PA TMDC18, PA PACM12, PA PACM14, PA PACM18, PA NDT/INDT, PA PACM10/11, PA PACM10/12, PA PACM12/612, PA PACM12/PACM14/612/614, PA MACMI/12, PA MACMT/12, PA MACMI/MACM12, PA MACMT/MACM12, PA MACMI/MACMT/12, PA MACMI/MACMT/MACM12/12, PA MACMI/MACMT/MACM12, PA 6I/6T/MACMI/MACMT, PA 6I/6T/MACMI/MACMT/12, PA 6I/6T/MACMI/MACMT/MACM12/12, PA 6I/6T/MACMI/MACMT/MACM12, PA MACM6/11, PA MACM6/12, PA MACM10/11, PA MACM10/12, PA MACM10/1010, PA MACM12/1012, PA MACM12/1212, PA MACM14/1014, PA MACM14/1214, PA MACM10/PACM10, PA MACM12/PACM12, PA MACM14/PACM14, PA MACM18/PACM18, PA 6I/6T/MACMI/MACMT/PACMI/PACMT/12, PA 6I/6T/MACMI/MACMT/MACM12/PACMI/PACMT/PACM12 and mixtures or copolymers hereof.

The amorphous or microcrystalline polyamide is selected very particularly preferably from the group consisting of PA MXDI/6I, PA MXDI/MXD6, PA MACM10, PA MACM12, PA MACM14, PA MACM18, PA TMDC10, PA TMDC12, PA PACM12, PA PACM14, PA PACM18, PA NDT/INDT, PA PACM12/612, PA PACM12/PACM14/612/614, PA MACMI/12, PA MACMT/12, PA MACMI/MACM12, PA MACMI/MACMT/12, PA MACMI/MACMT/MACM12, PA 6I/6T/MACMI/MACMT/12, PA MACM10/1010, PA MACM12/1012, PA MACM12/1212, PA MACM14/1014, PA MACM14/1214, PA MACM10/PACM10, PA MACM12/PACM12, PA MACM14/PACM14, PA MACM18/PACM18 and PA 6I/6T/MACMI/MACMT/PACMI/PACMT/12.

The proportion of 1,6-hexane diamine in PA MXDI/6I is preferably 15 to 40% by mol, particularly preferably 20 to 35% by mol, the sum of the molar proportions of all the monomers producing 100% by mol. Particularly preferably, the PA MXDI/6I has the molar ratio 46/54.

The proportion of 1,6-hexane diamine in PA PACM12/612 is preferably 2 to 24% by mol, particularly preferably 6 to 15% by mol, the sum of the molar proportions of all the monomers producing 100% by mol.

The proportion of 1,6-hexane diamine in PA PACM12/PACM14/612/614 is preferably 2 to 24% by mol, particularly preferably 6 to 15% by mol, the sum of the molar proportions of all the monomers producing 100% by mol. The proportion of 1,14-tetradecanedioic acid in PA PACM12/PACM14/612/614 is preferably 2 to 24% by mol, particularly preferably 6 to 15% by mol, the sum of all the molar proportions of all the monomers producing 100% by mol.

Amongst the PA MACMI/12, those with a proportion of laurinlactam of 15 to 50% by mol are preferred, the sum of all the molar proportions of all the monomers producing 100% by mol. PA MACMI/12 with a proportion of laurinlactam of 20 to 40% by mol are particularly preferred. PA MACMI/12 with a proportion of laurinlactam of 19% by mol or 35% by mol are preferred in particular.

Amongst the PA MACMI/MACMT/12, those with an equimolar ratio of isophthalic acid to terephthalic acid and a proportion of laurinlactam of 15 to 40% by mol are preferred, the sum of all the molar proportions of all the monomers producing 100% by mol. Particularly preferably, the PA MACMI/MACMT/12 have an equimolar ratio of isophthalic acid to terephthalic acid and a proportion of laurinlactam of 20 to 30% by mol. Particularly preferably, the PA MACMI/MACMT/12 has the molar ratio 38/38/24.

Amongst the PA MACMI/MACMT/MACM12, those with an equimolar ratio of isophthalic acid to terephthalic acid and a proportion of dodecanedioic acid of 30 to 60% by mol are preferred, the sum of all the molar proportions of all the monomers producing 100% by mol. Particularly preferably, the PA MACMI/MACMT/MACM12 have an equimolar ratio of isophthalic acid to terephthalic acid and a proportion of dodecanedioic acid of 40 to 50% by mol. Particularly preferably, the PA MACMI/MACMT/MACM12 has the molar ratio 27/27/46.

Amongst the PA 6I/6T/MACMI/MACMT/12, those with an equimolar ratio of isophthalic acid to terephthalic acid and a proportion of laurinlactam of 1 to 25% by mol are preferred, the sum of the molar proportions of all the monomers producing 100% by mol. Particularly preferably, the PA 6I/6T/MACMI/MACMT/12 have an equimolar ratio of isophthalic acid to terephthalic acid and a proportion of laurinlactam of 2 to 15% by mol. Particularly preferably, the PA 6I/6T/MACMI/MACMT/12 has the molar ratio 34/34/14/14/4.

The proportion of linear aliphatic diamine in PA MACM10/1010, PA MACM12/1012, PA MACM12/1212, PA MACM14/1014, PA MACM14/1214 is preferably 5 to 45% by mol, particularly preferably 8 to 27% by mol, very particularly preferably 10 to 22% by mol, the sum of the molar proportions of all the monomers producing 100% by mol.

The proportion of PACM in PA MACM10/PACM10, PA MACM12/PACM12, PA MACM14/PACM14 or PA MACM18/PACM18 is preferably 1 to 35% by mol, particularly preferably 2 to 25% by mol, the sum of the molar proportions of all the monomers producing 100% by mol.

Amongst the PA 6I/6T/MACMI/MACMT/PACMI/PACMT/12, those with an equimolar ratio of isophthalic acid to terephthalic acid and a proportion of laurinlactam of 1 to 25% by mol are preferred, the sum of the molar proportions of all the monomers producing 100% by mol. Particularly preferably, the PA 6I/6T/MACMI/MACMT/PACMI/PACMT/12 have an equimolar ratio of isophthalic acid to terephthalic acid and a proportion of laurinlactam of 2 to 15% by mol. Particularly preferably, the PA 6I/6T/MACMI/MACMT/PACMI/PACMT/12 have an equimolar ratio of isophthalic acid to terephthalic acid, a proportion of PACM of 2 to 7% by mol and a proportion of laurinlactam of 2 to 7% by mol.

The polyamide granulate displays a light transmission, measured according to ASTM D 1003 on plates of thickness 2 mm (produced in a high-gloss mould) of at least 75%, preferably of at least 83%, particularly preferably of at least 88%, and also very particularly preferably of at least 90%.

In mixtures of amorphous or microcrystalline and at least one partially crystalline aliphatic polyamide, the proportion of partially crystalline aliphatic polyamide is 2 to 40% by weight, preferably 3 to 30% by weight, particularly preferably 10 to 20% by weight.

The at least one partially crystalline, aliphatic polyamide as mixture component for the amorphous or microcrystalline polyamides is preferably selected from the group consisting of PA 6, PA 46, PA 49, PA 410, PA 411, PA 412, PA 413, PA 414, PA 415, PA 416, PA 418, PA 436, PA 66, PA 69, PA 610, PA 611, PA 612, PA 613, PA 614, PA 615, PA 616, PA 617, PA 618, PA 1010, PA 66/6, PA 6/66/12, PA 6/12, PA 11, PA 12, PA 912, PA 1212, PA MXD6, PA MXD9, PA MXD10, PA MXD11, PA MXD12, PA MXD13, PA MXD14, PA MXD15, PA MXD16, PA MXD17, PA MXD18, PA MXD36, PA PACM9, PA PACM10, PA PACM11, PA PACM12, PA PACM13, PA PACM14, PA PACM15, PA PACM16, PA PACM17, PA PACM18, PA PACM36, polyether amides, polyether ester amides, polyester amides and mixtures or copolymers thereof.

Particularly preferably, the partially crystalline, aliphatic polyamide is selected from the group consisting of PA 6, PA 69, PA 610, PA 612, PA 614, PA 1010, PA 1212, PA 6/66/12, PA 6/66, PA 6/12, PA 11, PA 12, polyether amides and polyether ester amides.

In mixtures of amorphous or microcrystalline polyamides and at least one impact modifier, the proportion of impact modifier is 2 to 14% by weight, preferably 4 to 12% by weight.

The at least one impact modifier as mixture component for the amorphous or microcrystalline polyamides is preferably selected from the group consisting of acrylate copolymers, acrylic acid copolymers, vinyl-acetate-copolymers, styrene copolymers, styrene block copolymers, core-shell impact modifiers and mixtures thereof.

Particularly preferably, the impact modifier is selected from the group consisting of ethylene-glycidylmethacrylate copolymers, ethylene-acrylate copolymers, styrene-butadiene-styrene triblock copolymers (SBS), styrene-ethylene/butylene-styrene triblock copolymer (SEBS), methacrylate-butadiene-styrene core-shell impact modifiers and mixtures thereof.

The at least one impact modifier is preferably functionalised, either by copolymerisation or by grafting with unsaturated carboxylic acids, unsaturated carboxylic acid derivatives and/or unsaturated glycidyl compounds.

The relative viscosity (RV) of the amorphous or microcrystalline polyamides is preferably 1.35 to 2.15, preferably 1.40 to 1.85, particularly preferably 1.45 to 1.75, measured with 0.5 g in 100 ml m-cresol at 20° C.

The relative viscosity (RV) of the partially crystalline, aliphatic polyamides is preferably 1.40 to 2.15, preferably 1.45 to 2.0, particularly preferably 1.50 to 1.90, measured with 0.5 g in 100 ml m-cresol at 20° C.

The polyamide granulates can in addition comprise further additives, in particular selected from the group consisting of condensation catalysts, chain regulators, defoamers, inorganic stabilisers, organic stabilisers, lubricants, colourants, marking means, pigments, colourants, nucleation agents, crystallisation retarders, antistatic agents, mould-release agents, optical brighteners, natural layer silicates, synthetic layer silicates and mixtures thereof.

As stabilisers or age-protecting agents, e.g. antioxidants, antiozonants, light-protection means, UV stabilisers, UV absorbers or UV blockers can be used in the amorphous or microcrystalline polyamides.

The further additives can be contained for example in a quantity of 0.01 to 6% by weight, relative to the total polyamide moulding compound.

According to the invention, a container for storage and transport of polyamide granulates, comprising at least one amorphous or microcrystalline polyamide, is likewise provided. This container comprises, in addition to the polyamide granulate, in addition at least one oxygen absorber for avoiding or reducing yellowing of moulded articles produced from the granulate.

The container has a barrier effect relative to oxygen and moisture, i.e. the container is essentially gas- and moisture-impermeable, and is preferably selected from the group consisting of sacks, bags, big bags, boxes, octabins, barrels, buckets, canisters and cans. The container preferably has a holding capacity of 1 to 1,000 kg of polyamide granulate, particularly preferably 5 to 700 kg, very particularly preferably 15 to 200 kg, in particular 18 to 28 kg.

By means of the barrier effect relative to oxygen, penetration of additional oxygen from the ambient air into the container is essentially prevented. For this purpose, the container comprises at least one barrier layer which is selected in particular from the group consisting of metal, aluminium, ethylene-vinyl alcohol copolymers (EVOH), polyvinylidine chloride (PVDC), polyvinyl chloride (PVC) and combinations thereof.

In order to counter penetration of moisture, the container likewise comprises a barrier layer which is selected in particular from the group consisting of metal, aluminium, polyvinylidene chloride (PVDC), polyvinyl chloride (PVC), polyolefins, polyethylene and combinations thereof.

According to the material from which the barrier layer is formed, this can be effective both against penetration of oxygen and against penetration of moisture.

For sacks, for example a laminate with a PE/PE/Alu/PE/PE construction and layer thicknesses of 100/25/7/25/100 µm is used.

Big bags, boxes and octabins comprise also inliners which provide the barrier effect relative to oxygen and moisture. Barrels, buckets, canisters and cans can include inliners which provide the barrier effect relative to oxygen and moisture if they are not themselves manufactured from metal.

Particularly preferably, the barrier effect is ensured by one or more layers of aluminium. The thickness of the individual aluminium layer is thereby 4 to 15 µm.

Inliners are shells made or extruded or laminated foils with one or more layers. The foils for inliners can be constructed more simply than foils for sacks and bags themselves since the mechanical strength in the case of packagings with inliners is already ensured by the outer packaging, e.g. box, octabin or barrel.

Sacks or bags can comprise monolayer or multilayer inliners without a barrier effect relative to oxygen in order to improve the mechanical properties of the packaging, in particular the strength or resistance to piercing.

With respect to the manner in which the oxygen absorber is placed in the packaging, there are no restrictions. In must merely be ensured that the oxygen absorber is not processed together with the polyamide granulate. If the oxygen absorber is added to the polyamide granulate in the form of sachets, this can be effected for example by a warning on the outside of the packaging. Particularly if a plurality of sachets is used, these can be combined in a net or cage for easier removal before the granulate processing. Sachets, net or cage can also be fixed on the inside of the packaging with contact to the residual air, for example by gluing, clamping or sewing. In a preferred embodiment, the sachets, nets or cages are provided with a projection, e.g. a cord or tab for easier fixing. By means of this projection, the oxygen absorber can be fixed to the sealing seam for example during sealing of the sack, bag or inliner.

The oxygen absorber can also be incorporated in one of the innermost layers of the packaging, the layers situated between the polyamide granulate and the layer with the oxygen absorber requiring to be oxygen-permeable. Preferably, the oxygen absorber is incorporated in the innermost or second-innermost layer. The oxygen absorber is thereby preferably an oxidisable metal powder or an oxidisable polymer.

If the oxygen absorber concerns an oxidisable polymer, one of the innermost layers of the packaging can be formed therefrom, preferably the innermost or second-innermost layer. If the oxidisable polymer concerns a polyamide, it is preferably incorporated in the innermost or second-innermost layer or this layer is produced therefrom. Particularly preferably, the second-innermost layer is produced from polyamide.

According to the invention, a polyamide granulate which was stored or transported according to the previously described method is likewise provided. A polyamide granulate, which was stored for six weeks at 60° C. according to this method, showed, after further processing to form 2 mm thick plates, a yellow index which is at least 0.2, preferably at least 0.7, particularly preferably at least 1.3, very particularly preferably at least 1.8, lower than the yellow index of an identically produced 2 mm thick plate which was stored and transported without the addition of an oxygen absorber under otherwise identical conditions.

According to the invention, moulded articles which were produced from the previously described polyamide granulate are likewise provided.

According to the invention a method for storage and for transport of polyamide granulate is provided, comprising at least one amorphous or microcrystalline polyamide granulate 2, whilst avoiding or reducing yellowing of moulded articles produced from the granulate 2, in which method the polyamide granulate 2 is kept in a container 1 with a barrier effect relative to oxygen and moisture, in which container, a sachet 3 containing at least one oxygen absorber is placed, which produces an essentially oxygen-free atmosphere in the container 1 which essentially prevents contact of the granulate with oxygen from the ambient air. As a result of the barrier effect of the container, penetration of additional oxygen and moisture from the ambient air into the container 1 is essentially prevented. This means that the container 1 is gas- and moisture-impermeable. In an embodiment, the sachet 3 containing the oxygen absorber is dispersed in contact with the granulate 2, and in another embodiment, the sachet 3 is placed on the lid of the container 1.

Implementation of the Storage Tests

For storage, 35 cm×53.5 cm large bags made of a PET/aluminium/PE laminate with layer thicknesses of 12/9/100 µm, laminated with a 2-component adhesive without solvent, were used (supplier: Vacopack H. Buchegger AG, Switzerland).

Unstored polyamide granulate was injection-moulded to form 60×60×2 mm plates. The yellow index of these plates is the yellow index at 0 h storage. The arithmetic average of the measurements on 5 plates is indicated.

2 kg of the polyamide granulate was weighed into the bag. Respectively after the storage test, a sachet of oxygen absorber O1 or O2 was provided or not in the bag. The excess residual air in the bag was pressed out of the bag and the bag was welded to be air-impermeable directly above the filling limit. As a result of this compression of the bag before the welding, residual air is situated only between the individual granulates.

Respectively a bag with and without oxygen absorber sachet was stored in a drying oven at 60° C. for two, four or six weeks. After storage, the bags were opened, the polyamide granulate was injection-moulded to form 60×60×2 mm plates and the yellow index of these plates was measured. The arithmetic average of the measurements on 5 plates is indicated.

Calculation of the Quantity of Residual Air

The quantity of residual air is calculated from the contents, the bulk density and the density of the polyamide granulate, and in fact according to formula (I):

$$\text{Residual air in ml} = (\text{contents in g/bulk density in g/ml}) - (\text{contents in g/density in g/ml}) \quad (I)$$

In the case of non-compressible containers, also the unused volume of the container which of course remains above the polyamide granulate must be taken into account in the calculation of the quantity of residual air.

Production of the 60×60×2 mm Plates

The plates were produced on an injection moulding machine of the company Arburg, Modell Allrounder 420 C 1000-250. Cylinder temperatures rising from 260 to 300° C. were thereby used. The mould temperature was 80 to 100° C.

The plates were used in the dry state; for this purpose, they were stored for at least 48 h at room temperature in a dry environment, i.e. over silica gel, after the injection moulding.

Within the scope of this application, the following measuring methods were used:

Relative Viscosity:

ISO 307 granulate 0.5 g in 100 ml m-cresol temperature 20° C.

calculation of the relative viscosity (RV) according to RV=t/$t_0$ following section 11 of the standard.

Glass transition temperature (Tg), heat of fusion and melting point:
ISO 11357
granulate
Differential scanning calorimetry (DSC) was implemented with a heating- and cooling rate of 20 K/min. At the melting point, the temperature at the peak maximum is indicated. The average of the glass transition range which is indicated as glass transition temperature (Tg) was determined according to the "half-step-height" method.

Yellow Index
ASTM E313
plate 60×60×2 mm
temperature 23° C.

The subject according to the invention is intended to be explained in more detail with reference to the subsequent examples without wishing to restrict said subject to the specific embodiments shown here.

In table 1, the materials used in the examples and comparative examples are listed.

TABLE 1

| Material | Description | Manufacturer |
|---|---|---|
| Polyamide A1 | Amorphous polyamide MACM12 made of bis(3-methyl-4-aminocyclohexyl)methane and dodecanedioic acid<br>RV* 1.70 (measured with 0.5 g in 100 ml m-cresol at 20° C.)<br>Glass transition temperature 155° C.<br>Density 1.00 g/ml, bulk density 0.630 g/ml | EMS-CHEMIE AG, Switzerland |
| Polyamide A2 | Amorphous polyamide 6I/6T/MACMI/MACMT/PACMI/PACMT/12 in the molar ratio 39/39/7.1/7.1/2.5/2.5/2.8 made of 1,6-hexane diamine, bis(3-methyl-4-aminocyclohexyl)methane, bis(4-aminocyclohexyl)methane, isophthalic acid, terephthalic acid and laurinlactam<br>RV* 1.62 (measured with 0.5 g in 100 ml m-cresol at 20° C.)<br>Glass transition temperature 159° C.<br>Density 1.15 g/ml, bulk density 0.685 g/ml | EMS-CHEMIE AG, Switzerland |
| Polyamide A3 | Microcrystalline polyamide MACM12/PACM12 made of bis(3-methyl-4-aminocyclohexyl)methane, bis(4-aminocyclohexyl)methane and 1,12-dodecanedioic acid<br>Molar ratio MACM:PACM = 30:70<br>RV* 1.80 (measured with 0.5 g in 100 ml m-cresol at 20° C.)<br>Glass transition temperature) 145° C., melting point 237° C.<br>Density 1.02 g/ml, bulk density 0.650 g/ml | EMS-CHEMIE AG, Switzerland |
| Polyamide A4 | Amorphous polyamide MACMI/MACMT/12 in the molar ratio 38/38/24 made of bis(3-methyl-4-aminocyclohexyl)methane, isophthalic acid, terephthalic acid and laurinlactam<br>RV* 1.53 (measured with 0.5 g in 100 ml m-cresol at 20° C.)<br>Glass transition temperature 190° C.<br>Density 1.06 g/ml, bulk density 0.645 g/ml | EMS-CHEMIE AG, Switzerland |
| Polyamide A5 | Amorphous polyamide MACMI/12 in the molar ratio 65/35 made of bis(3-methyl-4-aminocyclohexyl)methane, isophthalic acid and laurinlactam<br>RV* 1.56 (measured with 0.5 g in 100 ml m-cresol at 20° C.)<br>Glass transition temperature 160° C.<br>Density 1.06 g/ml, bulk density 0.645 g/ml | EMS-CHEMIE AG, Switzerland |
| Polyamide A6 | Amorphous polyamide 6I/6T made of hexamethylene diamine, isophthalic acid and terephthalic acid<br>Molar ratio isophthalic acid:terephthalic acid 67:33<br>RV* 1.54 (measured with 0.5 g in 100 ml m-cresol at 20° C.)<br>Glass transition temperature 125° C.<br>Density 1.18 g/ml, bulk density 0.715 g/ml | EMS-CHEMIE AG, Switzerland |
| Oxygen absorber O1 | Sachets with iron powder (ca. 3.1 g) and zeolite (ca. 1.3 g) with sodium chloride coating<br>Size** of the iron particles: 100-400 μm<br>Trade name: Ageless ZPT-200 | Mitsubishi Gas Chemical Company Inc., Japan |
| Oxygen absorber O2 | Sachets with iron powder (ca. 6.4 g) and zeolite (ca. 4.2 g) with sodium chloride coating<br>Size** of the iron particles: 100-400 μm<br>Trade name Ageless ZPT-500 | Mitsubishi Gas Chemical Company Inc., Japan |

*RV relative viscosity, measured on a solution of 0.5 g polyamide in 100 ml m-cresol at 20° C.)
**determined by scanning electron microscopy Table 2 shows a comparison of the yellow index of granulate made of polyamide A1 with different storage durations at a temperature of 60° C. The granulate stored in the container according to the invention is thereby compared with identical granulates, in the case of which containers without oxygen absorber were used during storage.

TABLE 2

| | Test | Unit | Yellow Index* | | | |
|---|---|---|---|---|---|---|
| Storage duration | number | h | 0 | 336 | 672 | 1,008 |
| Granulate A1 without oxygen absorber | CE1 | — | 0.6 | 1.8 | 2.4 | 3.3 |
| Granulate A1 with oxygen absorber O1 | E2 | — | | 0.6 | 1.0 | 1.2 |

*measured on 60 × 60 × 2 mm plates produced from the stored granulate

Table 3 shows the yellow index for a granulate made of polyamide A2 with different storage durations at a temperature of 60° C. The granulate stored in the container according to the invention is thereby compared with identical granulates, in the case of which containers without oxygen absorber were used during storage.

TABLE 3

| | Test | Unit | Yellow Index* | | | |
|---|---|---|---|---|---|---|
| Storage duration | number | h | 0 | 336 | 672 | 1,008 |
| Granulate A2 without oxygen absorber | CE3 | — | 2.1 | 4.7 | 6.0 | 6.3 |
| Granulate A2 with oxygen absorber O1 | E4 | — | | 3.0 | 3.7 | 4.4 |

*measured on 60 × 60 × 2 mm plates produced from the stored granulate

Table 4 shows the yellow index of the granulate made of polyamide A3 with different storage durations at a temperature of 60° C. The granulate stored in the container according to the invention is thereby compared with identical granulates, in the case of which containers without oxygen absorber were used during storage.

TABLE 4

| | Test | Unit | Yellow Index* | | | |
|---|---|---|---|---|---|---|
| Storage duration | number | h | 0 | 336 | 672 | 1,008 |
| Granulate A3 without oxygen absorber | CE5 | — | 0.2 | 1.0 | 2.0 | 2.8 |
| Granulate A3 with oxygen absorber O1 | E6 | — | | 0.3 | 0.3 | 1.0 |

*measured on 60 × 60 × 2 mm plates produced from the stored granulate

The quantity of residual air was calculated according to formula (I) for example E6 with the microcrystalline polyamide granulate A3 (PA MACM12/PACM12 molar ratio 30:70) from the contents (2,000 g), the bulk density (0.650 g/ml) and the density (1.02 g/ml) of the polyamide granulate A3 at 1,116 ml. In example E6, 49.7 mmol of iron per litre of residual air was hence used as oxygen absorber.

Table 5 shows the yellow index of the granulate made of polyamide A4 with different storage durations at a temperature of 60° C. The granulate stored in the container according to the invention is thereby compared with identical granulates, in the case of which containers without oxygen absorber were used during storage.

TABLE 5

| | Test | Unit | Yellow Index* | | | |
|---|---|---|---|---|---|---|
| Storage duration | number | h | 0 | 336 | 672 | 1,008 |
| Granulate A4 without oxygen absorber | CE7 | — | 1.3 | 5.0 | 5.6 | 6.3 |
| Granulate A4 with oxygen absorber O1 | E8 | — | | 3.1 | 3.6 | 3.6 |

*measured on 60 × 60 × 2 mm plates produced from the stored granulate

Table 6 shows the yellow index of the granulate made of polyamide A5 with different storage durations at a temperature of 60° C. The granulate stored in the container according to the invention is thereby compared with identical granulates, in the case of which containers without oxygen absorber were used during storage.

TABLE 6

| | Test | Unit | Yellow Index* | | | |
|---|---|---|---|---|---|---|
| Storage duration | number | h | 0 | 336 | 672 | 1,008 |
| Granulate A5 without oxygen absorber | CE9 | — | 2.4 | 3.2 | 4.1 | 4.1 |
| Granulate A5 with oxygen absorber O1 | E10 | — | | 2.1 | 3.1 | 3.2 |
| Granulate A5 with oxygen absorber O2 | E11 | — | | 1.2 | 2.3 | 2.8 |

*measured on 60 × 60 × 2 mm plates produced from the stored granulate

The quantity of residual air was calculated according to formula (I) for examples E10 and E11 with the amorphous polyamide granulate A5 (PA MACMI/12 molar ratio 65:35) at 1,214 ml. In example E10, 45.7 mmol of iron per litre of residual air was hence used as oxygen absorber, in example E11, in contrast, 94.4 mmol. Comparison of the values of examples E10 and E11 hence verifies the advantage of using an increased quantity of oxygen absorber.

Table 7 shows the yellow index of the granulate made of polyamide A6 with different storage durations at a temperature of 60° C. The granulate stored in the container according to the invention is thereby compared with identical granulates, in the case of which containers without oxygen absorber were used during storage.

TABLE 7

| | Test | Unit | Yellow Index* | | | |
|---|---|---|---|---|---|---|
| Storage duration | number | h | 0 | 336 | 672 | 1,008 |
| Granulate A6 without oxygen absorber | CE12 | — | 3.6 | 5.0 | 6.0 | 6.1 |
| Granulate A6 with oxygen absorber O1 | E13 | — | | 4.0 | 5.3 | 5.9 |
| Granulate A6 with oxygen absorber O2 | E14 | — | | 3.6 | 5.2 | 5.3 |

*measured on 60 × 60 × 2 mm plates produced from the stored granulate

Tables 2 to 7 show that, irrespective of the stored amorphous or microcrystalline polyamide granulate, by addition of an oxygen absorber (O1 or O2) based on iron powder, the yellow index of the plates produced from the stored polyamide granulate is reduced. This positive effect is established in the case of all storage durations (2, 4 or 6 weeks).

Tables 6 and 7 verify, with comparison of the values of examples E10 and E11 or E13 and E14, the advantage in addition of using an increased quantity of oxygen absorber since O2 comprises more iron powder than O1.

The invention claimed is:

1. A method of storing and transporting a polyamide granulate comprising at least one amorphous or microcrystalline polyamide, while avoiding or reducing yellowing of moulded articles produced from the granulate, the method comprising keeping the polyamide granulate in a container with a barrier effect relative to oxygen and moisture, providing at least one sealed sachet consisting of at least one oxygen absorber as its content, wherein the at least one sealed sachet is placed within the container, either in contact with the polyamide granulates or in a region of the container where polyamide granulates are not present, and producing an essentially oxygen-free atmosphere in the container;

wherein the at least one amorphous or microcrystalline polyamide is formed from at least one diamine and at least one dicarboxylic acid, and optionally from at least one lactam, wherein the at least one diamine is selected from the group consisting of hexamethylene diamine, 1,6-diamino-2,2,4-trimethylhexane, 1,6-diamino-2,4,4-trimethylhexane, 2-methyl-1,5-pentane diamine, 3,3'-dimethyl-4,4'-diaminodicyclohexylmethane, bis(p-aminocyclohexyl)methane, 3,3'-diethyl-4,4'-diaminodicyclohexylmethane, 3,5,3',5'-tetramethyl-4,4'-diaminodicyclohexylmethane, 2,2-bis(p-aminodicyclohexyl)propane, isophorone diamine, norbornane diamine, m-xylylene diamine, p-xylylene diamine, and 1,3-bis(aminomethyl)cyclohexane; and wherein the at least one dicarboxylic acid is selected from the group consisting of 1,6-hexanedioic diacid, 1,9-nonanedioic acid, 1,10-decanedioic acid, 1,12-dodecanedioic acid, 1,13-tridecanedioic acid, 1,14-tetradecanedioic acid, 1,15-pentadecanedioic acid, 1,16-hexadecanedioic acid, 1,18-octadecanedioic acid, 1,3-cyclohexanedicarboxylic acid, 1,4-cyclohexanedicarboxylic acid, 1,4-phenylene dioxydiacetic acid, 1,3-phenylene dioxydiacetic acid, dimer fatty acid with 36 or 44 C-atoms, isophthalic acid, terephthalic acid, and 2,6-naphthalene dicarboxylic acid.

2. The method according to claim 1, wherein the oxygen absorber comprises at least one oxidisable metal compound selected from the group consisting of oxidisable metal powders, oxidisable metal oxides, oxidisable metal salts or mixtures thereof.

3. The method according to claim 1, wherein the oxygen absorber is an oxidisable organic or inorganic compound or an enzyme.

4. The method according to claim 1, wherein the oxygen absorber is an oxidisable polymer.

5. The method according to claim 1, wherein the container comprises at least one barrier layer selected from the group consisting of metal, aluminium, ethylene-vinyl alcohol copolymers (EVOH), polyvinylidene chloride (PVDC), polyvinyl chloride (PVC), polyolefins, polyethylene and combinations thereof.

6. The method according to claim 1, wherein the polyamide granulate comprises at least one amorphous or microcrystalline polyamide or mixtures of at least one amorphous or microcrystalline polyamide with at least one partially crystalline polyamide and/or with at least one impact modifier.

7. The method according to claim 1, wherein the amorphous or microcrystalline polyamide is selected from the group consisting of PA MXDI/6I, PA MXDI/MXD6, PA MACM10, PA MACM12, PA MACM14, PA MACM18, PA TMDC10, PA TMDC12, PA PACM12, PA PACM14, PA PACM18, PA NDT/INDT, PA PACM12/612, PA PACM12/PACM14/612/614, PA MACMI/12, PA MACMT/12, PA MACMI/MACM12, PA MACMI/MACMT/12, PA MACMI/MACMT/MACM12, PA 6I/6T/MACMI/MACMT/12, PA MACM10/1010, PA MACM12/1012, PA MACM12/1212, PA MACM14/1014, PA MACM14/1214, PA MACM10/PACM10, PA MACM12/PACM12, PA MACM14/PACM14, PA MACM18/PACM18, and PA 6I/6T/MACMI/MACMT/PACMI/PACMT/12.

8. The method according to claim 7, wherein the amorphous or microcrystalline polyamide is selected from the group consisting of PA MACM12, PA MACM12/PACM12, PA 6I/6T/MACMI/MACMT/PACMI/PACMT/12, PA MACMI/MACMT/12, and PA MACMI/12.

* * * * *